United States Patent [19]

Thomas

[11] Patent Number: 5,095,223
[45] Date of Patent: Mar. 10, 1992

[54] DC/DC VOLTAGE MULTIPLIER WITH SELECTIVE CHARGE/DISCHARGE

[75] Inventor: Alexander C. Thomas, Horley, England

[73] Assignee: U.S. Philips Corporation, New York, N.Y.

[21] Appl. No.: 703,512

[22] Filed: May 21, 1991

[30] Foreign Application Priority Data

Jun. 13, 1990 [GB] United Kingdom ............... 9013163

[51] Int. Cl.[5] .......................................... H02M 3/18
[52] U.S. Cl. ..................................... 307/110; 363/60
[58] Field of Search ................ 363/59, 60; 320/1; 307/110

[56] References Cited

U.S. PATENT DOCUMENTS

| | | | |
|---|---|---|---|
| 4,134,057 | 1/1979 | Portmann | 363/60 |
| 4,186,436 | 1/1980 | Ishiwatari | 363/60 |
| 4,199,806 | 4/1980 | Patterson | 363/60 |
| 4,321,661 | 3/1982 | Sano | 307/110 |
| 4,777,577 | 10/1988 | Bingham et al. | 307/110 |
| 4,807,104 | 2/1989 | Floyd et al. | 363/59 |
| 4,900,947 | 2/1990 | Weiner et al. | 363/59 |
| 5,008,798 | 4/1991 | Harvey | 363/59 |

FOREIGN PATENT DOCUMENTS

| | | |
|---|---|---|
| 0257810 | 9/1988 | European Pat. Off. . |
| 1483382 | 8/1977 | United Kingdom . |
| 2090483 | 7/1982 | United Kingdom . |

*Primary Examiner*—Jeffrey Sterrett
*Attorney, Agent, or Firm*—Bernard Franzblau

[57] ABSTRACT

A DC/DC voltage multiplier comprises a charging source (Vs) connected between first and second terminals (Vdd and Vss), a storage capacitor (Ctr) connected between the first terminal and a third terminal (Vdd and Vtr), a plurality of voltage pump stages each comprising four switches (S1a, S1b and S1c) and a pump capacitor (C1). The switches are actuated under the control of a clock (not shown) so that the pump capacitors of the stages are charged one at a time. The multiplied voltage output between the first and third terminals Vdd and Vtr of the circuit is provided by the charging source (Vs) and the pump capacitors in those stages not currently being charged (C2,C3). Any number of voltage pump stages can be used provided that the output of each stage is connected to the input of the following stage and the circuit is driven by an appropriate clock. The output of the final stage is connected to the input of the first stage so as to form a ring of pump stages.

17 Claims, 5 Drawing Sheets

DC/DC VOLTAGE MULTIPLIER WITH SELECTIVE CHARGE/DISCHARGE

DESCRIPTION

Background of the Invention

This invention relates to a DC/DC voltage multiplier and more particularly to a DC/DC voltage multiplier which provides an output current by means of a series connected chain of charge storage devices, for example, capacitors, that are charged individually from a DC charging source.

Figure 1A:
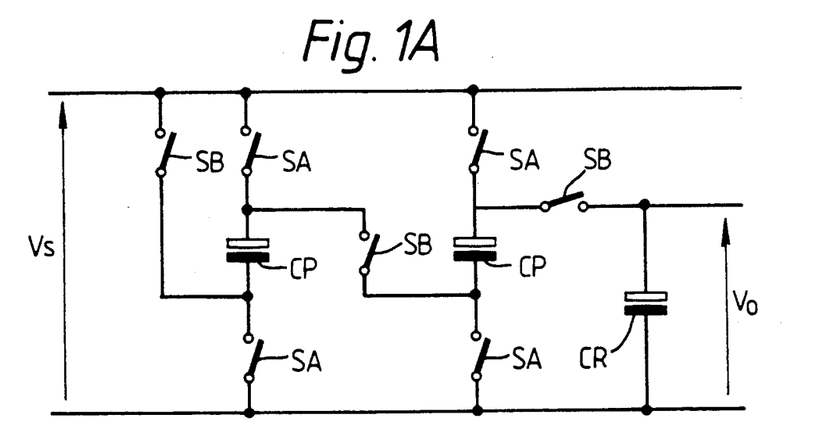
FIG. 1A is a schematic diagram of the pump circuit described in EP 0 257 810A.
Figure 1B:
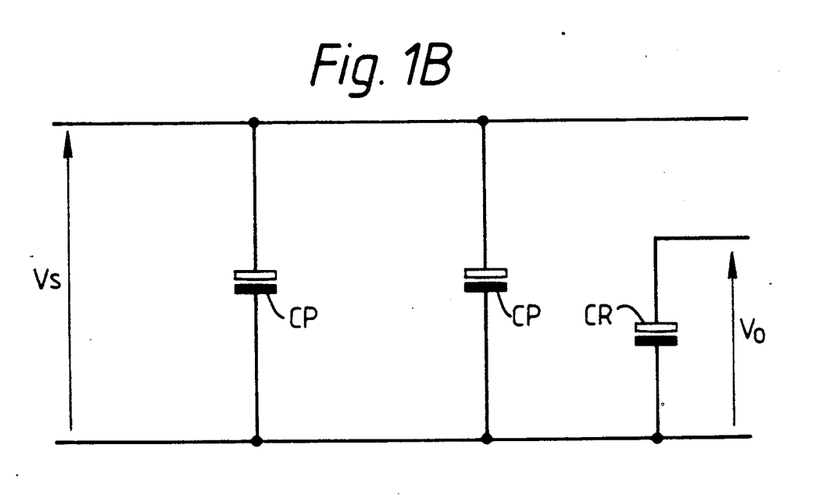
FIGS. 1B and 1C are diagrams of the pump circuit of FIG. 1A in its two phases of operation.
Figure 1C:
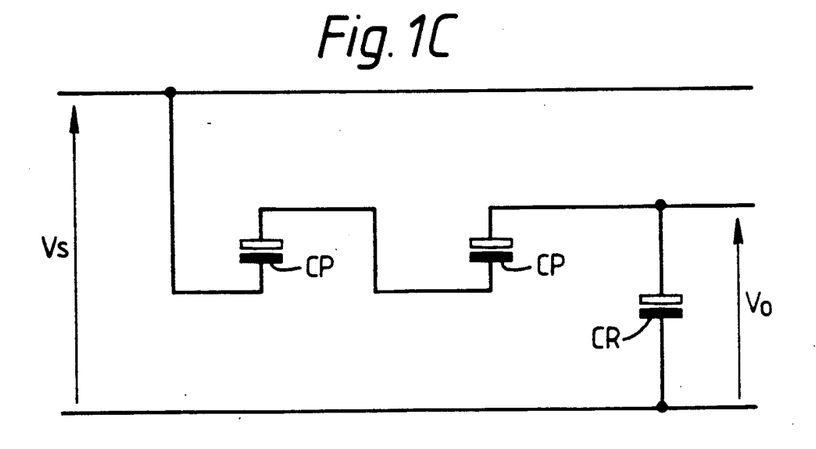

European patent specification EP 0 257 810A discloses a DC/DC voltage tripler for implementation by an integrated circuit which uses a charge pump circuit as shown in schematic form in FIG. 1A of the accompanying drawings. The circuit shown in FIG. 1A consists of a charging source with a voltage magnitude Vs, two pump capacitors CP, one reservoir capacitor CR and seven single pole switches. Four of the switches operate simultaneously and are designated SA and the remaining three switches are designated SB and operate in anti-phase to the switches SA. A load (not shown) can be connected across the reservoir capacitor CR. The circuit operates in two separate phases; a notional first phase is shown schematically in FIG. 1B of the accompanying drawings, and a notional second phase is shown schematically in FIG. 1C of the accompanying drawings. During the first phase of operation the switches SA are closed and the switches SB are open, and during the second phase of operation the switches SA are open and the switches SB are closed. In operation the circuit alternates between these two phases at a rate governed by an on-chip clock (not shown). The frequency of the on-chip clock can be adjusted by a suitable choice of an off-chip capacitor and an off-chip resistor. Referring to FIG. 1B, during the first clock phase, the charging source Vs is conected in parallel with the two pump capacitors CP, and these capacitors are charged to a voltage of nearly Vs. The output of the circuit during the first phase is supplied entirely by the reservoir capacitor CR. During the second phase, as shown in FIG. 1C, the charging source Vs and the two pump capacitors are connected in series to give nearly three times the charging source voltage Vs. This series combination is connected in parallel with the reservoir capacitor CR and any circuit load (not shown). A charging current for CR and any load current are supplied by the series combination of the charging source and the two pump capacitors. Typical values for the off-chip capacitors CP and CR are given as 10 $\mu$F and 100 $\mu$F, respectively.

The multiplying circuit described above is an adaptation of a well-known circuit to perform DC voltage doubling in which there is only one pump capacitor and four switches. One drawback of this type of circuit is that large noise spikes are introduced onto the supply at the commencement of the clock phases which could disrupt the operation of other circuitry. Another drawback is the large reservoir capacitor required to sustain the output voltage of the circuit during the phase of operation in which the pump capacitors are charged and to isolate the noise introduced by the switching circuit from the load.

SUMMARY OF THE INVENTION

An object of the present invention is to multiply a DC voltage with a charge pump circuit that causes reduced electrical disturbances at its input and output terminals.

According to the present invention there is provided a DC/DC voltage multiplier comprising a charging source, a pair of output terminals, a plurality of charge storage devices and connecting means for connecting the charge storage devices in a series chain between the output terminals, the connecting means being operable to rearrange the positions of the charge storage devices in the series chain relative to the output terminals and for connecting the charging source across a different one of said plurality of charge storage devices in each of the successive rearrangements of the charge storage devices.

Since each of the charge storage devices is charged individually and any load at the output of the multiplier is supplied almost continuously by the series connected chain of charge storage devices, electrical disturbances at the input and output of the multiplier are reduced.

In an embodiment of the invention, the connecting means may be operable to alter the relative positions of the charge storage devices in the series chain to permit the charging source and the multiplied voltage output to have a common electrical terminal. This aspect allows a multiplier in accordance with the invention to drive circuitry requiring a direct and a multiplied supply voltage with a common ground terminal.

The present invention provides a DC/DC voltage multiplier comprising a charging source, first and second output terminals and a plurality of charge pump stages arranged in a ring, each charge pump stage having a charge storage device connectable to the charging source, characterized in that each stage comprises a first switch having one terminal connected to a first terminal of the charging source and to the first output terminal, the remaining terminal of the first switch being connected to one terminal of a second switch and to a first terminal of a charge storage device. The remaining terminal of the second switch is connected to a first terminal of a third switch and to an output of a preceding stage in the ring, the remaining terminal of the third switch being connected to the second input terminal. The remaining terminal of the charge storage device is connected to a first terminal of a fourth switch and to an input to a following stage in the ring and the remaining terminal of the fourth switch is connected to a second terminal of the charging source. When the first, third and fourth switching means are rendered conductive, the second switching means is rendered non-conductive and vice versa, whereby to charge the charge storage device of any one of the charge pump stages the first and the fourth switching means of the stage operate to connect the terminals of the charge storage device to the terminals of the charging source, the third switching means of the stage operates to connect the output from the preceding stage to the second output terminal and the second switching means of the stage operates to disconnect the first terminal of the charge storage device from the output of the preceding stage. The voltage across the first and second output terminals is provided by the series connection of the charging source and the charge storage devices of the other of the charge pump stages.

The charge storage devices are depicted as capacitors in the following description and figures but may comprise alternative charge storage devices. The connecting means may comprise controlled switching means and, particularly if low power consumption is of importance, MOS transistor switches. In order to prevent a short circuit of either the charging source or any of the charge storage devices, a break-before-make action will generally be applied to the connecting means and this may cause interference spikes on the output of the voltage multiplier. To reduce or eliminate these spikes a filter can be used, one of the simplest being a reservoir capacitor connected between the output terminals of the multiplier.

BRIEF DESCRIPTION OF THE DRAWINGS

The present invention will now be described, by way of example, with reference to FIGS. 2, 3, 4, 5 and 6 of the accompanying drawings.

In the drawings.

In the Figures, the same reference symbols have been used to denote circuit elements with similar functions.

DESCRIPTION OF THE PREFERRED EMBODIMENTS

Figure 2:
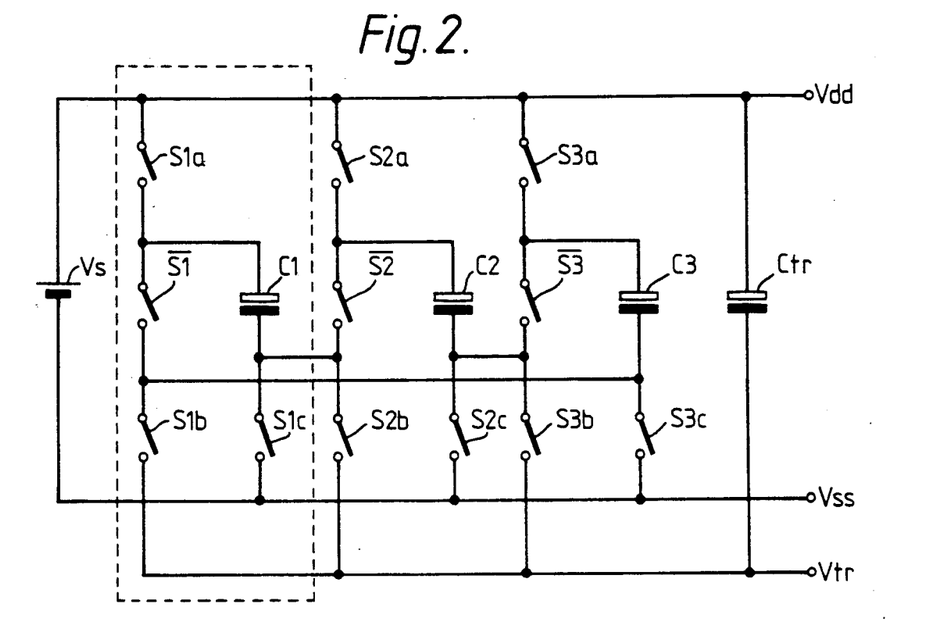
FIG. 2 is a schematic diagram of an embodiment of a DC/DC voltage tripler in accordance with the present invention.

FIG. 2 shows a voltage tripler circuit comprising a charging source Vs, three pump capacitors C1,C2,C3, a reservoir capacitor Ctr, the output terminals Vdd, Vss, Vtr, and twelve single pole, single throw switches S1a, S1, S1b, S1c, S2a, S2, S2b, S2c, S3a, S3, S3b, S3c. The circuit includes three identical subsections which are connected in a ring. The first such subsection, comprising the capacitor C1 and the switches S1a, S1, S1b and S1c, is enclosed in dotted lines in the Figure. The positive terminal of the charging source Vs is connected to one terminal on each of the switches S1a, S2a, S3a, to the positive terminal of the reservoir capacitor Ctr and to the output terminal Vdd. The negative terminal of the charging source Vs is connected to the output terminal Vss and to one terminal of each of the switches S1c, S2c and S3c. The remaining terminal of the switch S1a is connected to the positive plate of the pump capacitor C1 and to one terminal of the switch S1. The remaining terminal of the switch S1 is connected to one of the terminals of the switch S1b, to the negative plate of the capacitor C3 and to the remaining terminal of the switch S3c. The remaining terminal of the switch S1b is connected to one terminal on each of the switches S2b and S3b, to the negative plate of the capacitor Ctr and to the output terminal Vtr. The negative plate of the capacitor C1 is connected to the remaining terminal of the switch S1c, to one terminal of the switch S2 and to the remaining terminal of the switch S2b. The remaining terminal of the switch S2a is connected to the remaining terminal of S2 and to the positive plate of the capacitor C2. The negative plate of the capacitor C2 is connected to the remaining terminal of the switch S2c, the remaining terminal of the switch S3b and to one terminal of the switch S3. The remaining terminal of the switch S3a is connected to the remaining terminal of the switch S3 and to the positive plate of the capacitor C3.

Figure 3:
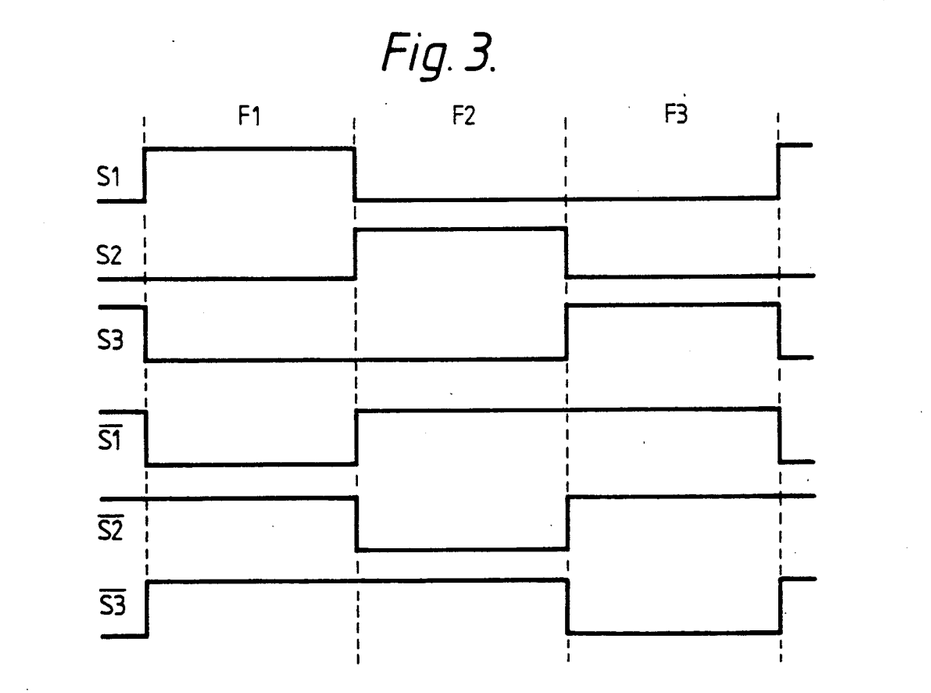
FIG. 3 is a timing diagram for the conduction intervals of the switches of the circuit shown in FIG. 2, FIGS. 4A, 4B and 4C are diagrams of the three phases of operation of a DC/DC voltage tripler in accordance with the present invention.

In operation the switches of the circuit of FIG. 2 are driven by a clock (not shown) that has six two state outputs S1, S2, S3, $\overline{S1}$, $\overline{S2}$, $\overline{S3}$ and three distinct output phases F1, F2, F3. FIG. 3 shows the timing diagram for the clock. During the phase F1, the outputs S1, $\overline{S2}$ and $\overline{S3}$ are high and the outputs S2, S3 and $\overline{S1}$ are low. During the phase F2, the outputs S2, $\overline{S1}$ and $\overline{S3}$ are high and the outputs S1, S3 and $\overline{S2}$ are low. During the phase F3, the outputs S3, $\overline{S1}$ and $\overline{S2}$ are high and the outputs S1, S2 and $\overline{S3}$ are low. When the output S1 is high, the switches S1a, S1b and S1c are closed and the switch S1 is open and vice versa. When the output S2 is high, the switches S2a, S2b and S2c are closed and the switch S2 is open and vice versa. When the output S3 is high the switches S3a, S3b and S3c are closed and the switch S3 is open and vice versa. The operation of the circuit of FIG. 2 will now be described with reference to FIGS. 4A, 4B and 4C.

Figure 4A:
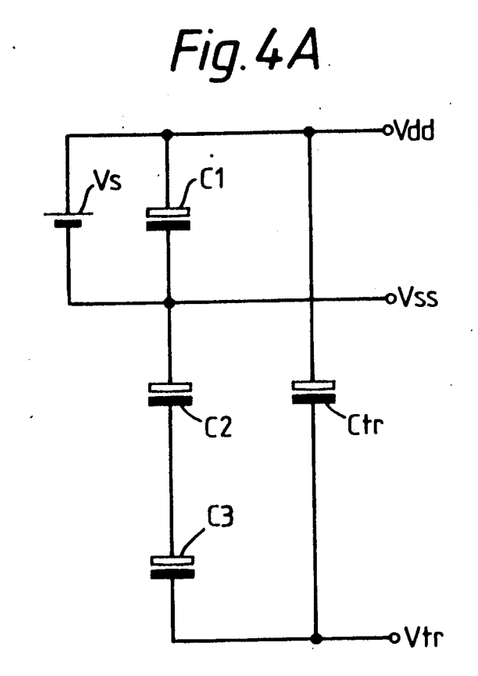
Figure 4B:
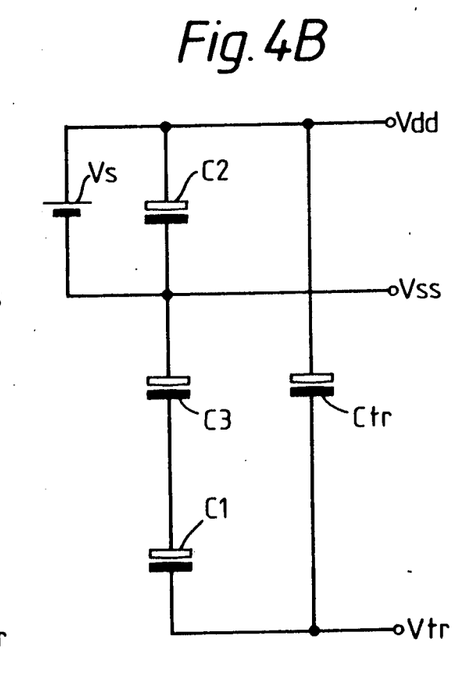
Figure 4C:
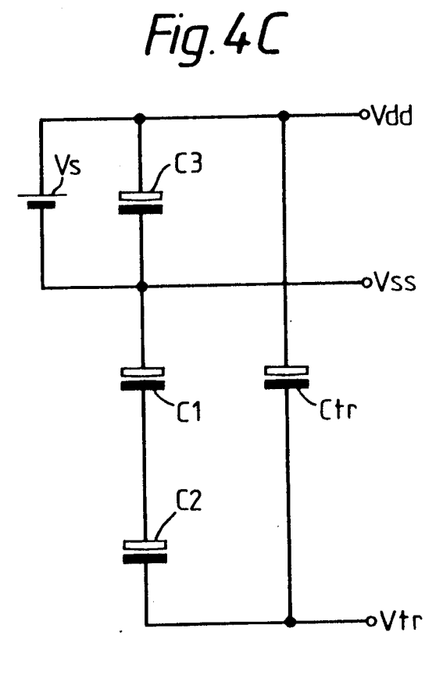

FIGS. 4A, 4B and 4C are diagrams of the three phases of operation of the DC/DC voltage tripler of FIG. 2. The clock means (not shown) causes the circuit to spend substantially equal proportions of time in each phase of operation. In the first phase F1 of operation, shown in FIG. 4A, the positive plate of a capacitor C1 is connected to the positive terminal of a charging source Vs and to an output terminal Vdd. The negative plate of the capacitor C1 is connected to the negative terminal of the charging source Vs, to an output terminal Vss and to the positive plate of a capacitor C2. The negative plate of the capacitor C2 is connected to the positive plate of a capacitor C3 and the negative plate of the capacitor C3 is connected to an output terminal Vtr. A reservoir capacitor Ctr is connected between the output terminals Vdd and Vtr with the positive plate of Ctr connected to the terminal Vdd. While the capacitors shown in the diagram are polarised types, this need not be the case in practice. An output directly from the charging source Vs is available between the terminals Vdd and Vss, and the output of the voltage tripler circuit is available between the terminals Vdd and Vtr. During this first phase of circuit operation the capacitor C1 is charged and the output current from the voltage tripler circuit is supplied by the charging source Vs and the capacitors C2 and C3.

In the second phase F2 of operation, shown in FIG. 4B, the positive plate of the capacitor C2 is connected to the positive terminal of the charging source Vs and to the output terminal Vdd. The negative plate of the capacitor C2 is connected to the negative terminal of the charging source Vs, to an output terminal Vss and to the positive plate of the capacitor C3. The negative plate of the capacitor C3 is connected to the positive plate of the capacitor C1 and the negative plate of the capacitor C1 is connected to the output terminal Vtr. The reservoir capacitor connections and the voltage relationships between the three output terminals is the same as during the first phase F1. During the second phase of circuit operation the capacitor C2 is charged and the output current from the voltage tripler circuit is supplied by the charging source Vs and the capacitors C3 and C1.

In the third phase F3 of operation, shown in FIG. 4C, the positive plate of the capacitor C3 is connected to the positive terminal of the charging source Vs and to the output terminal Vdd. The negative plate of the capacitor C3 is connected to the negative terminal of the charging source Vs, to the output terminal Vss and to the positive plate of the capacitor C1. The negative plate of the capacitor C1 is connected to the positive plate of the capacitor C2 and the negative plate of the capacitor C2 is connected to the output terminal Vtr. The reservoir capacitor connections and the voltage relationships between the three output terminals is the same as during the first and second phases, F1 and F2. During the third phase of circuit operation the capacitor C3 is charged and the output current from the voltage tripler circuit is supplied by the charging source Vs and the capacitors C1 and C2.

It can be observed that the capacitors are charged cyclically in the order C1, C2, C3, C1 and so on, although the reverse order would be equally applicable, namely C1, C3, C2, C1 and so on. The process of the reconnection of the capacitors C1, C2, C3 and the charging source Vs between clock phases takes a finite time since the connections that are due to be opened are opened slightly before those that are due to be closed are closed, using a break-before-make action. The reservoir capacitor Ctr provides the output current of the circuit during these short periods of time. This capacitor has the additional benefit of filtering any voltage spikes caused by the reconnection processes.

Figure 5:
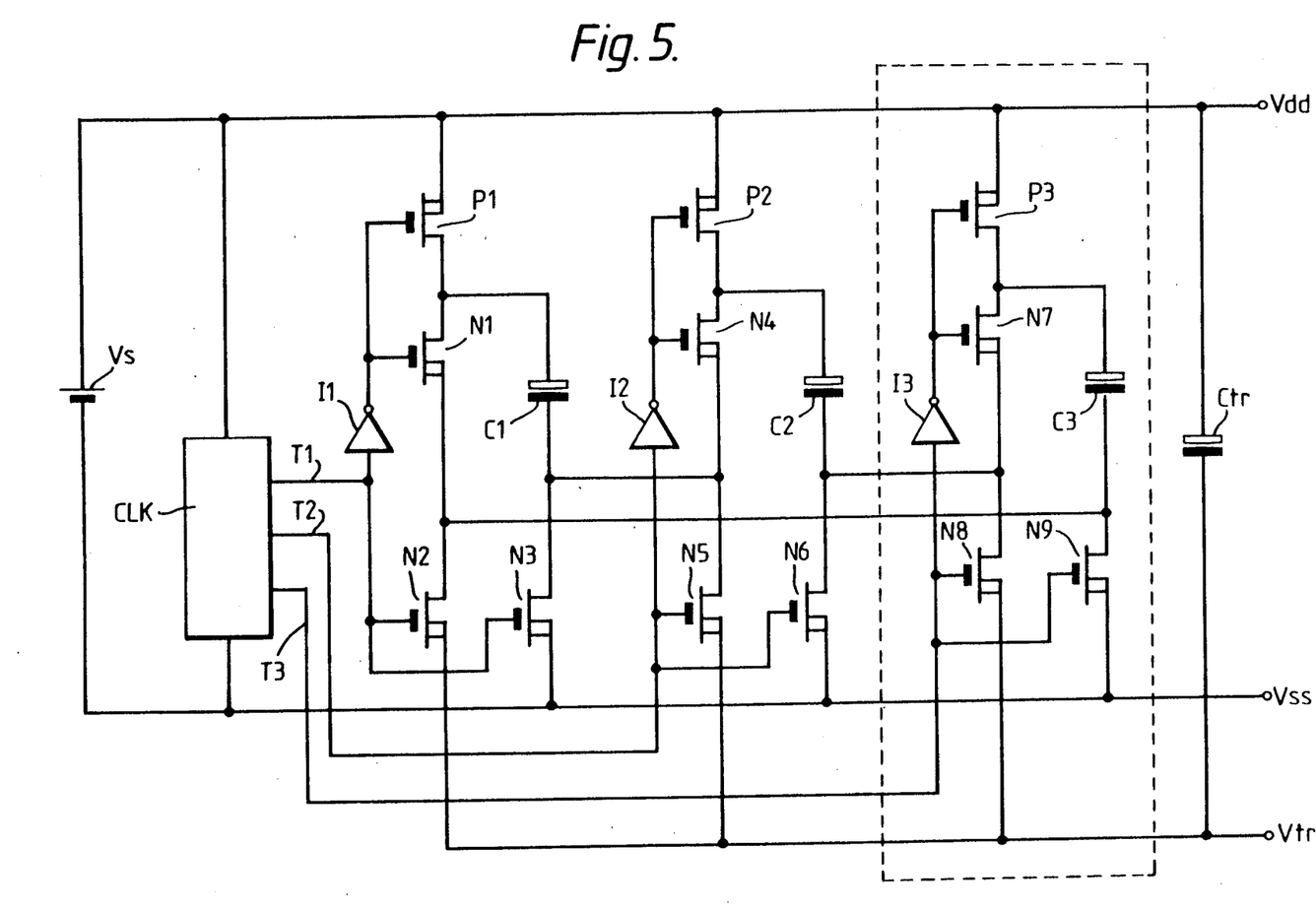
FIG. 5 is a schematic diagram of a voltage tripler of the type shown in FIG. 2 implemented using MOS transistors.

The voltage tripler circuit shown in FIG. 5 comprises a charging source Vs, a clock CLK, three output terminals Vdd, Vss and Vtr, three p-channel metal oxide silicon (MOS) transistors P1, P2 and P3, nine n-channel MOS transistors N1 to N9, three pump capacitors C1, C2 and C3 and three inverters I1, I2, and I3.

The positive terminal of the charging source Vs is connected to the clock CLK, to the drain terminals of the transistors P1, P2, P3, to the positive plate of the capacitor Ctr and to the output terminal Vdd. The negative terminal of the charging source Vs is connected to the clock CLK, to the drain terminals of the transistors N3, N6, N9 and to the output terminal Vss. The output terminal Vtr is connected to the negative plate of the capacitor Ctr and to the drain terminals of the transistors N2, N5 and N8. The source terminal of the transistor P1 is connected to the source terminal of the transistor N1 and to the positive plate of the capacitor C1. The source terminal of the transistor P2 is connected to the source terminal of the transistor N4 and to the positive plate of the capacitor C2. The source terminal of the transistor P3 is connected to the source terminal of the transistor N7 and to the positive plate of the capacitor C3. The drain terminal of the transistor N1 is connected to the source terminal of the transistor N2, to the negative plate of the capacitor C3 and to the source terminal of the transistor N9. The drain terminal of the transistor N4 is connected to the source terminal of the transistor N5, to the negative plate of the capacitor C1 and to the source terminal of the transistor N3. The drain terminal of the transistor N7 is connected to the source terminal of the transistor N8, to the negative plate of the capacitor C2 and to the source terminal of the transistor N6. The clock CLK has three output lines T1, T2, T3 that behave in the same manner respectively as the output lines whose waveforms S1, S2, S3 are shown in FIG. 3. The output line T1 is connected to the gates of the transistors N2, N3 and to the input of the inverter I1. The output of the inverter I1 is connected to the gates of the transistors P1 and N1. The output line T2 is connected to the gates of the transistors N5, N6 and to the input of the inverter I2. The output of the inverter I2 is connected to the gates of the transistors P2 and N4. The output line T3 is connected to the gates of the transistors N8, N9, and to the input of the inverter I3. The output of the inverter I3 is connected to the gates of the transistors P3 and N7.

With the exception of the charging source Vs, the clock CLK and the output terminals Vdd, Vss, Vtr, the circuit can be divided into three identical subsections or stages which all function in the same manner and which may be regarded as being connected in a ring.

The first stage comprises the transistors P1, N1, N2, N3, the capacitor C1, the clock line T1 and the inverter I1. The second stage comprises the transistors P2, N4, N5, N6, the capacitor C2, the clock line T2 and the inverter I2. The third stage comprises the transistors P3, N7, N8, N9, the capacitor C3, the clock line T3 and the inverter I3. In the Figure the third stage is enclosed in a dotted line. Each of the stages has a connection with both the preceding stage and the following stage. Although, for any one stage, it is not strictly accurate to refer to these two connections as an input and an output, identifying one as an output and the other as an input should aid the clarity of the following descriptions. The output of any stage is to be regarded as the connection to the negative plate of the capacitor and the input is to be regarded as the connection made between the n-channel MOS transistors of that stage. For example, in the third stage the output is the junction between the capacitor C3 and the source of the transistor N9, and the input is the junction between the drain of the transistor N7 and the source of the transistor N8. The output of the first stage is connected to the input of the second stage, the output of the second stage is connected to the input of the third stage and the output of the third stage is connected to the input of the first stage.

The voltage tripler shown in FIG. 5 operates in the same manner as that shown in FIG. 2 taking transistors P1, P2 and P3 of FIG. 5 to be equivalent to switches S1a, S2a and S3a of FIG. 2 respectively. Transistors N1, N4 and N7 of FIG. 5 correspond to switches S1, S2 and S3 of FIG. 2 respectively, transistors N2, N5 and N8 of FIG. 5 correspond to switches S1b, S2b and S3b of FIG. 2 respectively and transistors N3, N6 and N9 of FIG. 5 correspond to switches S1c, S2c and S3c of FIG. 2 respectively. The three inverters I1, I2 and I3 can be omitted from the multiplier if the gates of those MOS transistors connected to the outputs of the inverters are fed from respective inverted clock signals provided by the clock or some other means.

Figure 6:
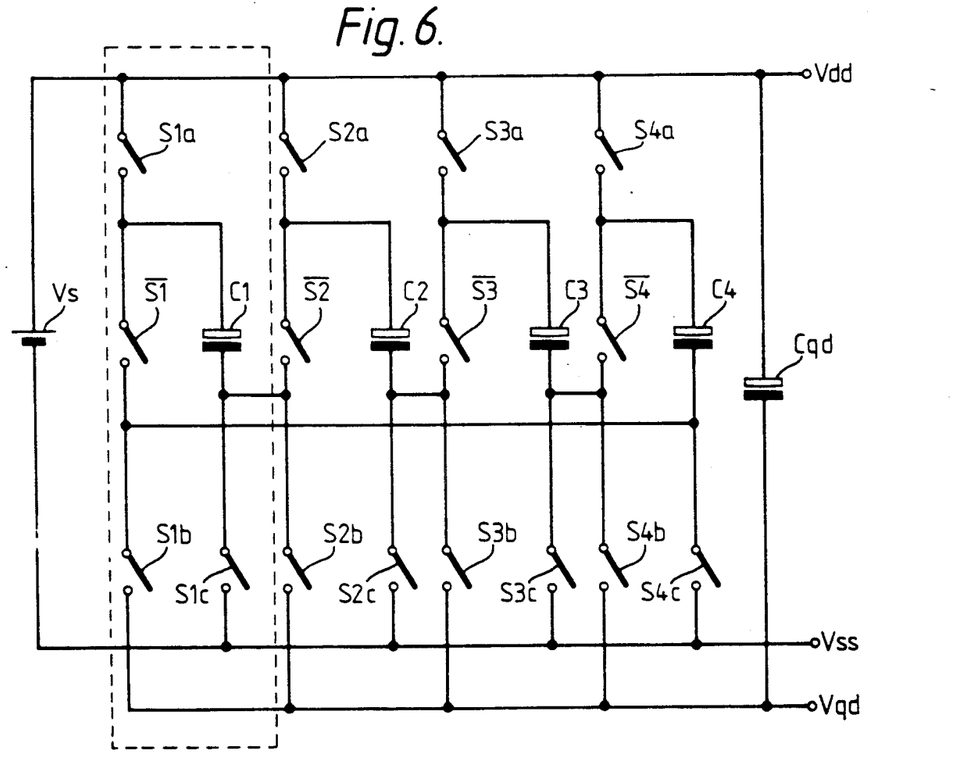
FIG. 6 is a schematic diagram of an embodiment of a DC/DC voltage quadrupler in accordance with the present invention.

FIG. 6 shows a schematic diagram of a voltage quadrupler made in accordance with the present invention. The circuit is similar to that of FIG. 2 but includes an extra stage so that a voltage output of approximately four times the input voltage is available. As in FIG. 2, the first stage is enclosed in a dotted line. In addition to that of FIG. 2, the circuit includes a fourth stage comprising four single pole, single throw switches S4a, S4, S4b, S4c and a pump capacitor C4. In FIG. 6, the output reservoir capacitor has been referenced Cqd and the multiplier voltage output terminal has been referenced Vqd. One terminal of the switch S4a is connected to the positive terminal of the charging source Vs. The remaining terminal of the switch S4a is connected to one of the terminals of the switch S4 and to the positive plate of the capacitor C4. The link which exists in FIG. 2 between the negative plate of the capacitor C3 and the junction of switches S1 and S1b has effectively been broken. The remaining terminal of the switch S4 is connected to one of the terminals of the switch S4b, to the negative plate of the capacitor C3 and to that terminal of the switch S3c that is not connected to the charging source Vs. The remaining terminal of the switch S4b is connected the output terminal Vqd. The negative plate of the capacitor C4 is connected to one of the terminals of the switch S4c and to that terminal of the switch S1 that is connected to one of the terminals of the switch S1b. The remaining terminal of the switch S4c is connected to the negative terminal of the charging source Vs.

The circuit of FIG. 6 operates under the control of a clock (not shown) having four distinct output phases F1, F2, F3, and F4, and eight two state output lines S1, S2, S3, S4, $\overline{S1}$, $\overline{S2}$, $\overline{S3}$ and $\overline{S4}$. During the phase F1, the output lines S1, $\overline{S2}$, $\overline{S3}$ and $\overline{S4}$ are high and the output lines $\overline{S1}$, S2, S3 and S4 are low. During the phase F2, the output lines S2, $\overline{S1}$, $\overline{S3}$ and $\overline{S4}$ are high and the output lines S1, S3, S4 and $\overline{S2}$ are low. During the phase F3, the output lines S3, $\overline{S1}$, $\overline{S2}$ and $\overline{S4}$ are high and the output lines S1, S2, S4 and $\overline{S3}$ are low. During the phase F4, the output lines S4, $\overline{S1}$, $\overline{S2}$ and $\overline{S3}$ are high and the output lines S1, S2, S3 and $\overline{S4}$ are low. The operation of this voltage quadrupler is entirely analagous to that of the voltage tripler described previously and by adding extra stages in the manner described, the invention can be extended to provide voltages multiplied by still larger factors.

In the foregoing description it has been assumed that the pump capacitors C1, C2, C3 and C4 are equal in size and that the clock phases F1, F2, F3 and F4 are equal in duration. In applications where the load current fluctuates widely it might be desirable to have unequal values for the pump capacitors and/or the clock phase periods.

While the charging source is shown in the accompanying drawings as a dry cell, it will be understood that the description encompasses any suitable DC source.

While the circuits shown in FIGS. 2, 5 and 6 have a positive ground, it will be appreciated that by reversing the polarity of all the capacitors, the charging source and in the case of the circuit shown in FIG. 5, the transistors, equivalent negative ground circuits are obtainable. Indeed, the charge storage devices used in embodiments of the invention could comprise unpolarised capacitors and in that case a reversal in the polarity of the outputs of the circuit could be effected without reversing the orientation of the capacitors.

From reading the present disclosure, other modifications will be apparent to persons skilled in the art. Such modifications may involve other features which are already known in the design, manufacture and use of DC/DC voltage multipliers and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any variation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A DC/DC voltage multiplier comprising a charging source, a pair of output terminals, a plurality of charge storage devices and connecting means for connecting the charge storage devices in a series chain between the output terminals, the connecting means being operable to rearrange the positions of the charge storage devices in the series chain relative to the output terminals and for connecting the charging source across a different one of said plurality of charge storage devices in each of the successive rearrangements of the charge storage devices.

2. A multiplier as claimed in claim 1, characterized in that a filter is included at one or both of the output terminals.

3. A multiplier as claimed in claim 2, characterized in that said filter comprises a storage capacitor connected between the pair of output terminals.

4. A multiplier as claimed in claim 1 characterized in that the connecting means comprise switching devices.

5. A multiplier as claimed in claim 4, characterized in that the switching devices comprise MOS devices.

6. A multiplier as claimed in claim 1, characterized in that said connecting means are operable to alter the relative positions of the charge storage devices in the series connected chain substantially simultaneously with the connection of the charging source to one of the charge storage devices.

7. A multiplier as claimed in claim 6, characterized in that a filter is included at one or both of the output terminals.

8. A multiplier as claimed in claim 6, characterized in that the connecting means comprise switching devices.

9. A multiplier as claimed in claim 8, characterized in that a filter is included at one or both of the output terminals.

10. A multiplier as claimed in claim 6, characterized in that said connecting means are operable to alter the relative positions of the charge storage devices in order to maintain one of the output terminals at the same potential as one of the terminals of the charging source.

11. A multiplier as claimed in claim 10, characterized in that the connecting means comprise switching devices.

12. A multiplier as claimed in claim 10, characterized in that a filter is included at one or both of the output terminals.

13. A multiplier as claimed in claim 12, characterized in that the connecting means comprise switching devices.

14. A DC/DC voltage multiplier comprising: a charging source, first and second output terminals and a plurality of charge pump stages arranged in a ring, each charge pump stage having a charge storage device connectable to the charging source, characterized in that each stage comprises a first switch having one terminal connected to a first terminal of the charging source and to the first output terminal, a second terminal of the first switch being connected to one terminal of a second switch and to a first terminal of a charge storage device, a second terminal of the second switch being connected to a first terminal of a third switch and to an output of a preceding stage in the ring, a second terminal of the third switch being connected to the second output terminal, a second terminal of the charge storage device being connected to a first terminal of a fourth switch and to an input to a following stage in the ring and a second terminal of the foruth switch being connected to a second terminal of the charging source, and in that when the first, third and fourth switching means are rendered conductive the second switching means is rendered non-conductive and vice versa, whereby to charge the charge storage device of any one of the charge pump stages the first and the fourth switching means of the stage operate to connect the terminals of the charge storage device to the terminals of the charging source, the third switching means of the stage operates to connect the output from the preceding stage to the second output terminal and the second switching means of the stage operates to disconnect the first terminal of the charge storage device from the output of the preceding stage, the voltage across the first and second output terminals being provided by the series connection of the charging source and the charge storage devices of the other of the charge pump stages.

15. A voltage multiplier comprising:
first and second terminals for connection to a source of input voltage,
first and second output terminals for developing an output voltage which is a multiple of the input voltage,
a plurality of voltage storage stages coupled together in a ring, each stage including a voltage storage device and switching means, and
means for cyclically operating said switching means so as to cyclically couple the voltage storage devices to said first and second terminals in mutually individual time intervals, so as to couple an output of a preceding stage to the second output terminal, and to decouple a first terminal of the voltage storage device from the output of the preceding stage whereby said output voltage is developed across the first and second output terminals at any instant of time by means of a series connection of the input voltage and those voltage storage devices that are then decoupled from the first and second terminals.

16. A voltage multiplier as claimed in claim 15 wherein said voltage storage devices comprise capacitors.

17. A voltage multiplier as claimed in claim 15 wherein said switching means are operated so that as each voltage storage device is coupled to the first and second terminals, the other voltage storage devices in the ring are decoupled from said first and second terminals.

* * * * *